(12) United States Patent
Xu et al.

(10) Patent No.: US 11,906,074 B2
(45) Date of Patent: Feb. 20, 2024

(54) ELECTRIC CONTROL VALVE DETECTION DEVICE AND ELECTRIC CONTROL VALVE SIGNAL DETECTION METHOD

(71) Applicant: CITIC Dicastal Co., Ltd., Qinhuangdao (CN)

(72) Inventors: Zuo Xu, Qinhuangdao (CN); Hanqi Wu, Qinhuangdao (CN); Naili Li, Qinhuangdao (CN)

(73) Assignee: CITIC Dicastal Co., Ltd., Qinhuangdao (CN)

( * ) Notice: Subject to any disclaimer, the term of this patent is extended or adjusted under 35 U.S.C. 154(b) by 317 days.

(21) Appl. No.: 17/387,953

(22) Filed: Jul. 28, 2021

(65) Prior Publication Data
US 2023/0003317 A1   Jan. 5, 2023

(30) Foreign Application Priority Data
Jun. 30, 2021   (CN) .......................... 202121474605.6

(51) Int. Cl.
*F16K 37/00* (2006.01)
*F16K 31/06* (2006.01)

(52) U.S. Cl.
CPC ...... *F16K 37/0083* (2013.01); *F16K 31/0675* (2013.01)

(58) Field of Classification Search
CPC ................................ F16K 37/00; F16K 31/06
See application file for complete search history.

(56) References Cited

U.S. PATENT DOCUMENTS

2013/0340744 A1\* 12/2013 Heusser .................. F24S 50/20
    137/513.5
2021/0323529 A1\* 10/2021 Diekmeyer ........... F15B 13/086

\* cited by examiner

*Primary Examiner* — Neel D Shah
(74) *Attorney, Agent, or Firm* — IPro, PLLC

(57) ABSTRACT

The disclosure relates to the technical field of hydraulic pneumatic systems, in particular to an electric control valve detection plug and an electric control valve signal detection method. The disclosure can accurately measure the electric control signal actually obtained by the valve, thus avoiding the risk of misjudgment. The disclosure has simple manufacture and convenient installation and disassembly.

6 Claims, 2 Drawing Sheets

ELECTRIC CONTROL VALVE DETECTION DEVICE AND ELECTRIC CONTROL VALVE SIGNAL DETECTION METHOD

TECHNICAL FIELD

The disclosure relates to the technical field of hydraulic pneumatic system, in particular to an electric control valve detection plug.

BACKGROUND

At present, the hydraulic pneumatic system is widely used in all kinds of equipments, among which the electric control valve is an indispensable and important component of the hydraulic pneumatic system. Electric control valves include electromagnetic reversing valves, proportional reversing valves, proportional pressure regulating valves, etc. When the hydraulic pneumatic system fails, first confirm whether the electric control signal is normal in line with the troubleshooting steps from simple to difficult. Blind disassembly and replacement of hydraulic components will not only prolong the downtime and waste effort, but also has the risk of polluting the hydraulic system. When confirming whether the electric control signal is normal, the plug is usually unplugged and whether the electrical signal on the plug is normal is measured separately. This detection method has a great possibility of misjudgment, such as poor contact between the plug and the terminal of the valve; although the control signal is output to the plug, the valve is not energized.

SUMMARY

The disclosure provides an electric control valve detection plug. The disclosure can accurately measure the electric control signal actually obtained by the valve, thus avoiding the risk of misjudgment. Moreover, the plug is simple to manufacture, convenient to install and disassemble, and suitable for popularization and use by maintenance and after-sales teams.

In order to achieve the above purpose, the disclosure provides the following technical solution:

The electric control valve detection device comprises an armature and an insulating block. One end of the armature is a socket, which is connected with the solenoid valve terminal; the other end is a terminal, which is connected with a power plug; the insulating block is made of insulating material and is provided with three mounting grooves for mounting armature; the three sides of the insulating block are provided with holes, the holes are communicated with the mounting groove, and the holes are used for inserting a multimeter needle and measuring an electric control signal.

In some embodiments, the top of the insulating block mounting groove is provided with a protrusion that prevents the armature from dislodging when the armature is inserted in place.

In some embodiments, a round through hole is machined in the center of the insulating block, and the plug fixing bolt can pass through the test plug, the fixed plug and the test plug.

As shown in FIG. 1, the electric control valve signal detection method includes unplugging the plug of the electric control valve to be measured, inserting the socket end of the electric control valve detection device into the terminal of the electromagnetic valve, and inserting the electric control valve device into the terminal end of the electric control valve detection device. The multimeter is used to extend into the detection hole on the detection plug of the electric control valve, so that the electric control signal actually received by the electric control valve can be measured.

BRIEF DESCRIPTION OF FIGURES

In order to more clearly explain the technical solution in the embodiment of the present disclosure, the drawings required for use in the description of the embodiments will be briefly described below, and it will be apparent that the drawings described below are some of the embodiments of the present disclosure from which other drawings may be obtained without creative effort by those of ordinary skill in the art.

Among them: 1—electric control valve plug, 2—electric control valve detection plug, 3—electric control valve, 4—insulation block, 5—armature.

DETAILED DESCRIPTION

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

A clear and complete description of the technical solution of the embodiments of the present disclosure will be given below in conjunction with the accompanying drawings in the embodiments of the present disclosure, and it will be apparent that the described embodiments are part of the embodiments of the present disclosure, but not all of them. Based on the embodiments in the present disclosure, all other embodiments obtained by those of ordinary skill in the art without making creative efforts fall within the scope of protection of the present disclosure.

Figure 2:
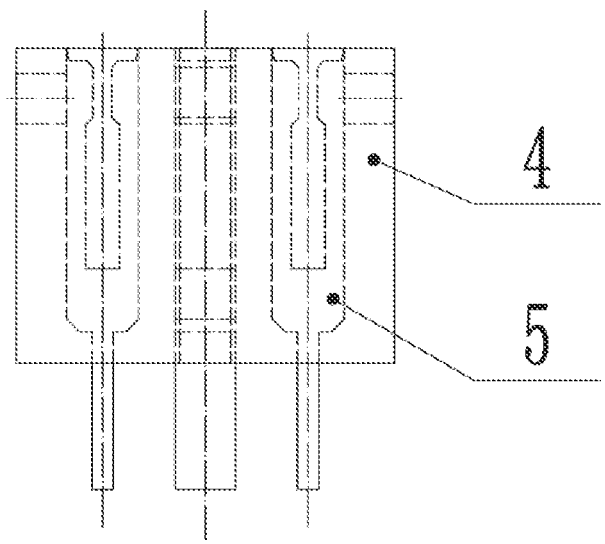
FIG. 2 is a structural schematic diagram of an electric control valve detection plug of the present disclosure.
Figure 3:
FIG. 3 is a schematic diagram of armature structure.
Figure 4:
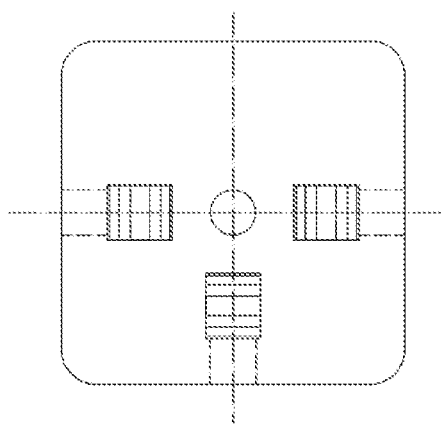
FIG. 4 is a schematic diagram of the structure of the insulating block.

Embodiment 1 of the present disclosure is described below with reference to FIGS. 2, 3 and 4: an electric control valve detection plug comprising an armature and an insulating block. One end of the armature is a socket, which is connected with the solenoid valve terminal; the other end is a terminal, which is connected with a power plug; the insulating block is made of insulating material and is provided with three mounting grooves for mounting armature; the three sides of the insulating block are provided with holes, the holes are communicated with the mounting groove, and the holes are used for inserting a multimeter needle and measuring an electric control signal.

In some embodiments, the top of the insulating block mounting groove is designed with a triangular protrusion that prevents the armature from dislodging when the armature is inserted in place.

In some embodiments, a round through hole is machined in the center of the insulating block, and the plug fixing bolt can pass through the test plug, the fixed plug and the test plug.

Figure 1:
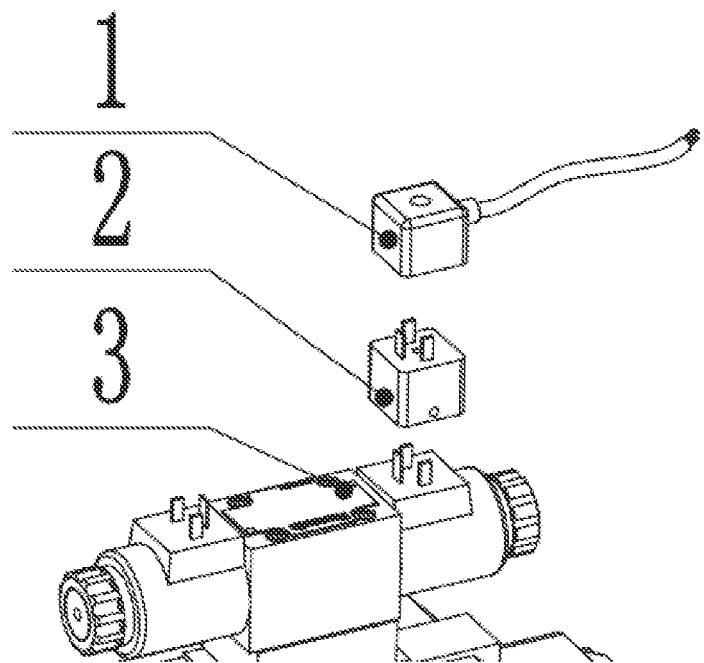
FIG. 1 is a schematic diagram of the installation of an electric control valve detection plug of the present disclosure.

Embodiment 2 of the present disclosure is described with reference to FIG. 1: an electric control valve signal detection method. As shown in FIG. 1, the electric control valve plug to be measured is unplugged, the socket end of the electric control valve detection plug is inserted into the solenoid valve terminal, and then the electric control valve plug is inserted into the terminal end of the electric control valve detection plug. Then, the multimeter is used to extend into the detection hole on the detection plug of the electric control valve, so that the electric control signal actually received by the electric control valve can be measured.

It can be seen that the electric control signal actually obtained by the valve can be accurately measured by using the disclosure, and the risk of misjudgment is avoided. Moreover, the plug is simple to manufacture, convenient to install and disassemble, and suitable for popularization and use by maintenance and after-sales teams.

What is claimed is:

1. An electric control valve detecting device for detecting whether the transmission of an electric control signal to an electric control valve is normal, the electric control valve has a power plug and a first terminal for receiving the electric control signal from the power plug,
   the electric control valve detecting device comprising an armature and an insulating block,
   wherein one end of the armature is a socket which is configured to receive and electrically connect with the first terminal of the electric control valve;
   the other end of the armature is a terminal, which is configured to be plugged into and electrically connected with the power plug of the electric control valve;
   a mounting groove is arranged in the insulating block, and the armature is arranged in the mounting groove;
   the side surface of the insulating block has detection holes, which are communicated with the mounting groove.

2. The electric control valve detecting device according to claim 1, wherein the number of mounting grooves in the insulating block is 3.

3. The electric control valve detecting device according to claim 1, wherein the number of detection holes arranged in the insulating block is 3.

4. The electric control valve detecting device according to claim 1, wherein the top of the insulating block mounting groove is provided with a protrusion.

5. The electric control valve detecting device according to claim 1, wherein a through hole is arranged in the center of the insulating block, the through hole is configured to receive a plug fixing bolt to fix the power plug and the electric control valve detecting device.

6. A method of detecting whether the transmission of an electric control signal to an electric control valve is normal by using an electric control valve detecting device, wherein
   the electric control valve has a power plug and a first terminal for receiving the electric control signal from the power plug,
   the electric control valve detecting device comprising an armature and an insulating block,
   one end of the armature is a socket which is configured to receive and electrically connect with the first terminal of the electric control valve;
   the other end of the armature is a terminal, which is configured to be plugged into and electrically connected with the power plug of the electric control valve;
   a mounting groove is arranged in the insulating block, and the armature is arranged in the mounting groove;
   the side surface of the insulating block has detection holes, which are communicated with the mounting groove
   wherein the method comprises the following steps:
   Unplugging the power plug of the electric control valve to be measured;
   Inserting the first terminal of the electric control valve into the socket end of the electric control valve detecting device, and inserting a terminal end of the electric control valve detecting device into the power plug of the electric control valve;
   extending a multimeter into the detection hole on the side surface of the electric control valve detecting device to measure the electric control signal actually received by the first terminal of the electric control valve.

* * * * *